(No Model.)
C. N. SHAW.
PADDLE FOR HANDLING BUTTER, &c.
No. 438,953. Patented Oct. 21, 1890.
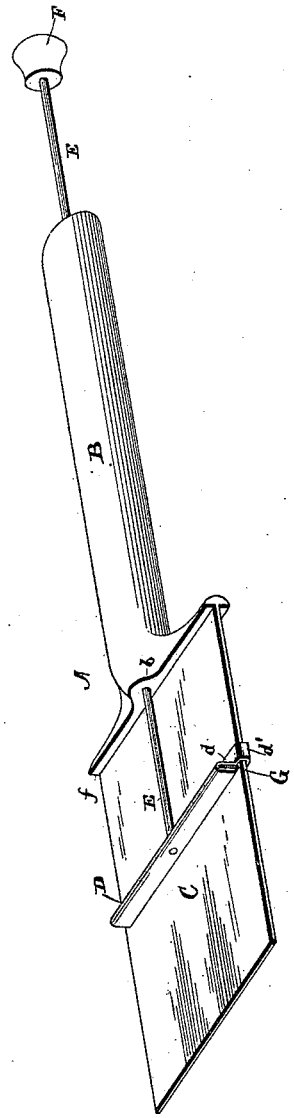
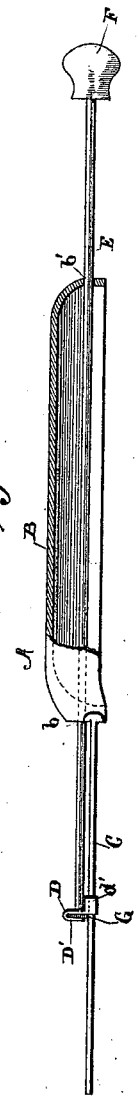
Fig.1.
Fig.2.
Charles N. Shaw.
Inventor
Witnesses
by
Attorney

UNITED STATES PATENT OFFICE.

CHARLES N. SHAW, OF PETOSKEY, MICHIGAN.

PADDLE FOR HANDLING BUTTER, &c.

SPECIFICATION forming part of Letters Patent No. 438,953, dated October 21, 1890.

Application filed July 24, 1890. Serial No. 359,794. (No model.)

*To all whom it may concern:*

Be it known that I, CHARLES N. SHAW, a citizen of the United States of America, residing at Petoskey, in the county of Emmet and State of Michigan, have invented certain new and useful Improvements in Paddles for Handling Butter, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in paddles or scoops for removing butter, lard, and other similar substances from vessels.

The object of the invention is to provide a paddle or flat scoop with a sliding pusher which is attached to a supplemental handle for scraping the material which may adhere to the face of the scoop or paddle therefrom; and it consists in providing a flat paddle with a movable scraper, said scraper being attached to a supplemental handle which passes through a guide at the upper end of the paddle or flat scoop, and means for limiting the movement thereof, as will be hereinafter fully set forth, and particularly pointed out in the claims.

In the accompanying drawings, forming part of this specification, Figure 1 is a perspective view of a paddle or scoop, showing my improvement applied thereto. Fig. 2 is a side view partly in section.

A refers to the paddle, which consists of the handle B and blade C, which are preferably formed of one piece of metal, the end of the handle portion being rounded on its upper portion, as shown, and provided with openings $b\ b'$. The blade of the scraper is preferably constructed so as to taper longitudinally, and is provided on its upper edge adjacent to the handle with a raised portion $f$. On the under side there may be a re-enforcing rib.

The handle B is semicircular in cross-section and is formed integral with the blade, the blade and handle being preferably made up of a single casting, and said handle is provided with openings $b$ and $b'$, through which the rod carrying the scraper D passes, the movement of said rod being limited in one direction by the knob F engaging with the upper end of the handle and in an opposite direction by the scraper D abutting against the vertical flange $f$. The scraper D is made up of a single piece of sheet metal, one edge of the same being bent at right angles to the body portion, which will lie parallel to the face of the paddle, the ends of this portion $d$ being bent over, as shown at $d'$ so as to embrace the edges of the paddle C. The vertical portion of the scraper D is bent so as to retain in place a strip of material, as rubber or leather, which contacts with the face of the paddle when the scraper is moved over the same. The rod E is suitably secured to the central portion of the scraper and passes through the openings $b$ and $b'$ in the handle.

Having thus described my invention, what I claim as new, and desire to secure by Letters Patent, is—

1. The combination, in a paddle or scoop made of a single piece of metal and provided with a raised handle portion, with openings, substantially as shown, of a scraper having bent ends which embrace the sides of the blade, a bar secured to said scraper, said bar passing through the perforations in the handle, a vertical portion $f$, against which the scraper will abut, and a knob secured to the bar for limiting the movement thereof in an opposite direction, substantially as shown, and for the purpose set forth.

2. In combination with a scoop or paddle constructed substantially as shown, a scraper D, made up of a single piece of metal, the ends thereof being bent to embrace the sides of the paddle, the vertical portion being bent upon itself to embrace a pliable strip, and operating-rod E, substantially as set forth.

In testimony whereof I affix my signature in presence of two witnesses.

CHARLES N. SHAW.

Witnesses:
 EWING W. PIESTER,
 G. BURTON HULL.